US012645237B2

(12) United States Patent
Wu

(10) Patent No.: US 12,645,237 B2
(45) Date of Patent: Jun. 2, 2026

(54) CURRENT LIMITING CIRCUIT PORTION

(71) Applicant: Nordic Semiconductor ASA, Trondheim (NO)

(72) Inventor: Hsin-Ta Wu, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 458 days.

(21) Appl. No.: 18/107,396

(22) Filed: Feb. 8, 2023

(65) Prior Publication Data

US 2023/0251677 A1 Aug. 10, 2023

(30) Foreign Application Priority Data

Feb. 9, 2022 (GB) ...................................... 2201637

(51) Int. Cl.
*G05F 1/56* (2006.01)
*G05F 1/565* (2006.01)
*G05F 1/575* (2006.01)
*G05F 1/595* (2006.01)

(52) U.S. Cl.
CPC .............. *G05F 1/565* (2013.01); *G05F 1/575* (2013.01); *G05F 1/595* (2013.01)

(58) Field of Classification Search
CPC .......... G05F 1/565; G05F 1/575; G05F 1/595; G05F 1/573; H02H 9/025; H02H 9/026
See application file for complete search history.

(56) References Cited

U.S. PATENT DOCUMENTS

| | | | | |
|---|---|---|---|---|
| 5,684,663 A * | 11/1997 | Mitter | H02H 9/025 361/103 |
| 2019/0243400 A1* | 8/2019 | Tomioka | G05F 1/573 |
| 2022/0352818 A1* | 11/2022 | D'Souza | H02M 1/0045 |
| 2025/0103082 A1* | 3/2025 | Sabut | G05F 3/267 |

FOREIGN PATENT DOCUMENTS

EP 0 766 362 A2 4/1997

OTHER PUBLICATIONS

IPO Combined Search and Examination Report under Sections 17 and 18(3) for GB2201637.2, mailed Mar. 22, 2022, 6 pages.

* cited by examiner

*Primary Examiner* — Lakaisha Jackson
(74) *Attorney, Agent, or Firm* — Klarquist Sparkman, LLP

(57) ABSTRACT

A current limiting circuit portion for limiting an output current of an electronic device includes an input voltage line for receiving an input voltage and a trimming circuit portion. The trimming circuit portion includes a resistive part providing a first resistance that is configurable based on one or more resistance control signals applied thereto, and a condition-tracking part connected in series with the resistive part that includes a condition-tracking transistor, the condition-tracking part providing a second resistance that is dependent on temperature and the input voltage.

19 Claims, 2 Drawing Sheets

CURRENT LIMITING CIRCUIT PORTION

CROSS-REFERENCE TO RELATED APPLICATION

The application claims priority from Great Britain Application No. GB2201637.2, filed on Feb. 9, 2022, which application is incorporated herein by reference in its entirety.

FIELD

The invention relates to a providing current limit protection—e.g. in the event of a short-circuit—for an output pin of an electronic device, particularly by limiting a current that flows through the output pin to a permissible maximum.

BACKGROUND

When an output pin of an electronic device is short-circuited e.g. through contact with a person or an external wire or device, an output current flowing through the output pin can spike. This can be problematic, as such a spike in current can cause damage to internal components of the electronic device, or damage components of a device which causes the short. It is therefore desirable to protect against such short-circuits.

Some prior implementations of short-circuit protection function by limiting a current that flows through an output pin to a permissible maximum. However, such prior implementations have been found to show substantial variation in the maximum permissible output current that is allowed to flow through the output pin.

Some of these variations can be caused by parameter variations in distinct electronic components and integrated circuits, from their nominal values, that occur as a result of manufacturing imperfections. One technique for reducing such variations is to perform a process called trimming: a process performed by a manufacturer, after a device has been manufactured but before it is deployed, in order to optimise the operation of that particular component or device so as to account for these variations. Trimming usually involves configuring one or more configurable parameters of a circuit based on measured parameters of that circuit.

For example, while a resistor may be designed to have a particular nominal resistance, it may have an actual resistance that is different from that nominal value in practice, due to manufacturing imperfections. Thus, it may be necessary to trim an electronic device in order to account for this deviation in resistance so as to enable the device to operate as intended by the designer.

The present invention aims to address at least some of the issues set out above.

SUMMARY OF THE INVENTION

When viewed from a first aspect, the invention provides a current limiting circuit portion for limiting an output current of an electronic device, the current limiting circuit portion comprising:

an input voltage line for receiving an input voltage; and a trimming circuit portion comprising:

- a resistive part providing a first resistance that is configurable based on one or more resistance control signals applied thereto; and
- a condition-tracking part connected in series with the resistive part and comprising a condition-tracking transistor, the condition-tracking part providing a second resistance that is dependent on temperature and said input voltage.

Thus it will be seen by those skilled in the art that in accordance with the invention the output current, e.g. that flows through an output pin of an electronic device, can be limited by a circuit portion which is trimmed in such a way that variations in temperature and input voltage are at least partially accounted for. By limiting the output current that flows through the output pin, the circuit portion may provide short circuit protection for the output pin by preventing the output current from exceeding a desired maximum.

The circuit portion will typically be configured to limit the output current to a maximum. In practice maximum current limit may be dependent, at least in part, on temperature and the input voltage of the device. The input voltage may be subject to variation within a permitted operating range. The trimming circuit portion may enable the circuit portion to be trimmed by the manufacturer in order to: i) set the maximum output current, under normal operating conditions, to a desired value; and ii) reduce the amount by which the maximum output current deviates from the desired value as a result of variation in such operating conditions. Advantageously, this may ensure that the circuit portion provided in accordance with the present invention can provide effective output current limitation, and therefore effective short circuit protection for an output pin, over a large range of operating conditions.

In a set of embodiments, the current limiting circuit portion further comprises a supply rail for receiving a supply voltage. The supply voltage may be received from other circuitry contained within the device, and it may be subject to variation within a permitted operating range. Thus, in a set of embodiments, the second resistance (i.e. the resistance of the condition-tracking part) is also dependent on the supply voltage, as well as temperature and the input voltage.

In some embodiments the input voltages in the permitted operating range for the input voltage are lower than the supply voltages in the permitted operating range for the supply voltage. In some examples the input voltage is subject to variation within a permitted range of 1.68V to 1.92V, and the supply voltage is subject to variation within a permitted range of 2.4V to 5.5V, though it will be appreciated that other permitted operating ranges for the input voltage and the supply voltage may be envisaged.

The configurable first resistance is the overall resistance of the resistive part of the trimming circuit portion and may control, at least in part, the maximum output current under normal operating conditions. Thus, the maximum output current under normal operating conditions may be configured to a desired value using the one or more resistance control signals. The second resistance is the overall resistance of the condition-tracking part of the trimming circuit portion which includes a transistor—and is dependent on temperature, input voltage and optionally supply voltage. This part may cause the overall resistance of the trimming circuit portion to vary with temperature, input voltage and supply voltage. This may reduce deviations in the maximum output current from the desired value that occur as a result of variations in operating conditions, particularly input voltage, supply voltage and temperature. In some embodiments, the condition-tracking part of the trimming circuit portion comprises a plurality of transistors connected in series.

In other words, the resistive part of the trimming circuit portion may primarily enable control of the maximum output current under normal operating conditions, and the condition-tracking part of the trimming circuit portion may be provided primarily to reduce variations in the maximum output current that occur as a result of operating conditions deviating from the normal operating conditions.

In a set of embodiments, the resistive part comprises a plurality of resistors and a selective bypass connection arranged to bypass at least one of the resistors in dependence on the one or more resistance control signals. The plurality of resistors may be connected in series. The selective bypass connection may comprise at least one bypass transistor. The one or more resistance control signals may be fed to a gate terminal of the bypass transistor. The provision of the bypass connection within the resistive part enables the first resistance to be configured using the one or more resistance control signals.

The one or more resistance control signals, and thus the first resistance of the resistive circuit portion, will typically be set during a trimming process at manufacture/production testing in order to configure the maximum output current to a desired value. Additionally or alternatively, the one or more resistance control signals, and thus the first resistance of the resistive circuit portion, may be set based on detected operating conditions while the device is in operation, thereby providing further ability for the circuit portion to respond to changes in operating conditions.

In a set of embodiments, the condition-tracking transistor is configured to operate in a linear region. The condition-tracking transistor may comprise an N-channel metal-oxide-semiconductor field-effect (NMOS) transistor. Alternatively, the condition-tracking transistor may comprise a P-channel metal-oxide-semiconductor field-effect (PMOS) transistor, provided appropriate changes are made to the remainder of the circuit portion e.g. by replacing PMOS transistors with NMOS transistors, or vice versa. By configuring the condition-tracking transistor to operate in the linear region, it may effectively function like a resistor with a resistance that is dependent on temperature and on a voltage applied to a gate terminal thereof, which may be dependent on input voltage. Thus, the condition-tracking transistor may have a resistance that is dependent on temperature, input voltage and optionally supply voltage. Advantageously, this means that the resistance of the condition-tracking transistor varies in dependence on any variations in operating conditions (particularly temperature, and input voltage) that may occur.

In a set of embodiments, a gate terminal of the condition-tracking transistor is coupled to a configurable voltage source, the configurable voltage source being configured to provide a voltage to a gate terminal of the condition-tracking transistor that causes it to operate in the linear region. In this way, the circuit portion in accordance with the present invention may be trimmed by configuring the voltage applied to the gate terminal of the condition-tracking transistor such that it operates in the linear region across a large range of operating conditions. The configurable voltage source may supply the gate terminal of the condition-tracking transistor with a voltage that is dependent on input voltage In a set of embodiments, the circuit portion further comprises a sensing circuit portion, the sensing circuit portion comprising:

a main transistor; and a sensing device;

wherein:

the main transistor is arranged such that the output current flows therethrough; and the sensing device is coupled to the main transistor and configured such that a current that flows through the sensing device is dependent, at least in part, on the output current.

By arranging the main transistor to be in the same current path as the output current, the output current may be dependent, at least in part, on a voltage at a gate terminal of the main transistor. Thus, advantageously, the output current may be controlled by controlling the voltage at the gate terminal of the main transistor. The main transistor may comprise a PMOS transistor. The main transistor may alternatively comprise an NMOS transistor, provided appropriate changes are made to the remainder of the circuit portion e.g. by replacing one or more PMOS transistors with NMOS transistors, or vice versa, or it may comprise a plurality of transistors—e.g. an NMOS transistor and a PMOS transistor arranged to form a transmission gate switch.

The sensing device may comprise a single sensing transistor, though in a set of embodiments, the sensing device comprises a plurality of sensing transistors connected in series, wherein a gate terminal of each sensing transistor is coupled to a gate terminal of each other sensing transistor. With such an arrangement, the sensing device may be considered to effectively function as a single effective transistor. A current that flows through each of the sensing transistors may be equal to a current that flows through each of the other sensing transistors.

A gate terminal of the sensing device may be connected to the gate terminal of the main transistor, and thus the current that flows through the sensing device may also be dependent, at least in part, on the voltage at the gate terminal of the main transistor. Thus, the current that flows through the sensing device may be dependent, in part, on the current that flows through the main transistor, i.e. the output current. The current that flows through the sensing device may therefore be used to detect a spike in the output current, and thus enable the circuit portion to respond accordingly—e.g. by controlling the voltage at the gate terminal of the main transistor so as to limit the current flowing through it, and therefore limit the output current.

An input terminal of the main transistor may be coupled to the input voltage line. Similarly, an input terminal of the sensing device may also be coupled to the input voltage line. The input terminal of the main transistor may comprise a source terminal of the main transistor, and the input terminal of the sensing device may comprise a source terminal of the sensing device where the sensing device is a transistor or operates as an effective transistor.

In a set of embodiments, an output of the sensing circuit portion is coupled to an input of the trimming circuit portion, such that any current that flows through the sensing device also flows through the trimming circuit portion. The current that flows through the sensing circuit portion may therefore be dependent, at least in part, on the configuration of the trimming circuit portion—i.e. whether or not any of the resistors are bypassed, the voltage that is applied to the gate terminal of the condition-tracking transistor, etc. The trimming circuit portion may therefore be configured such that the current that flows through the sensing portion has a desired relationship to the current that flows through the main transistor (i.e. the output current), e.g. a proportional relationship with a desired proportionality constant. This advantageously means the circuit portion can be trimmed, after manufacture, so that the circuit portion provides a desired level of current limitation, accounting for parameter variations in various components included in the circuit portion.

In a set of embodiments, the sensing circuit portion comprises a first differential amplifier, wherein:

a first input of the first differential amplifier is coupled to an output terminal of the main transistor;

a second input of the first differential amplifier is coupled to an output terminal of the sensing device; and an output of the first differential amplifier is coupled to a gate terminal of a sensing branch output transistor that is located in a same current path as the sensing device.

Such an arrangement may form a feedback loop in which the first differential amplifier effectively tries to equalise the voltages at the output terminals of the main transistor and the sensing device (e.g. equalise the drain-to-source voltages of the main transistor and sensing device where the sensing device is a transistor or operates as an effective transistor) by controlling the gate voltage of the sensing branch output transistor and thus controlling, at least in part, the voltage at the output terminal of the sensing device. Advantageously this feedback loop can ensure that the current that flows through the sensing device is proportional to the output current that flows through the main transistor, with a proportionality constant that is dependent on a ratio between a size of the main transistor and a size of the sensing device where the sensing device is a transistor or operates as an effective transistor. Advantageously, this may force the current that flows through the sensing device to respond more quickly to variations in the output current that flows through the main transistor, and thus decrease the overall response time of the circuit portion.

An input terminal of the sensing branch output transistor may be coupled to the output terminal of the sensing device. The output terminal of the main transistor may comprise a drain terminal of the main transistor, and the output terminal of the sensing device may comprise a drain terminal of the sensing device where the sensing device is a transistor or operates as an effective transistor. The input terminal of the sensing branch output transistor may comprise a source terminal of the sensing branch output transistor.

The first differential amplifier may comprise an operational transconductance amplifier (OTA). The first differential amplifier may output a signal that is dependent, at least in part, on the difference between the voltage at its first input (i.e. the voltage at the output terminal of the main transistor) and the voltage at its second input (i.e. the voltage at the output terminal of the sensing device).

The voltage at the gate terminals of each of the sensing transistors may be dependent, at least in part, on supply voltage. Thus, the resistance (and therefore the voltage drop) across each of the sensing transistors may also be dependent, at least in part, on supply voltage.

Although there are other options, in a set of embodiments, the configurable voltage source coupled to the gate terminal of the condition-tracking transistor comprises a configurable connection to one of a plurality of nodes within the sensing device. Thus, as the voltage drop across each of the sensing transistors may be dependent on supply voltage, the voltage at the gate terminal of the condition-tracking transistor (and thus its resistance) may track variations in supply voltage. Furthermore, where the input terminal of the sensing device is coupled to the input voltage line, the voltage at each of the plurality of nodes within the sensing device may also be dependent on input voltage. Thus, the voltage at the gate terminal of the condition-tracking transistor may be dependent on, and thus track variations in, the input voltage. This causes the second resistance of the condition-tracking part of the trimming circuit portion (e.g. the resistance of the condition-tracking transistor) in such embodiments to track variations in supply voltage and input voltage, and thus advantageously enables the circuit portion to reduce variations in the maximum output current that may occur as a result of such variations.

In a set of embodiments, the circuit portion further comprises a feedback loop configured to counter-act increases in the output current that flows through the main transistor. The feedback loop may provide negative feedback to the gate terminal of the main transistor—e.g. in response to an increase in the output current, the feedback loop may control the voltage at the gate terminal of the main transistor such that the output current flowing through the main transistor decreases accordingly. Thus, the feedback loop may advantageously cause the output current to be limited to a desired value by counter-acting increases in the output current over a desired maximum, the desired permissible maximum being determined, at least in part, based on the configuration of the trimming circuit portion.

In a set of embodiments, the feedback loop comprises a second differential amplifier, wherein a first input of the second differential amplifier is coupled to a substantially constant reference voltage, and a second input of the second differential amplifier is coupled to a configurable node within the trimming circuit portion. The second differential amplifier may output a signal that is dependent, at least in part, on the difference between the voltage at its first input and the voltage at its second input. The second differential amplifier may comprise an operational transconductance amplifier (OTA).

By having the second input of the second differential amplifier coupled to a configurable node within the trimming circuit portion, the voltage applied to said second input may be configured so as to provide optimum performance of the feedback loop, and therefore the circuit portion as a whole. The configurable node, and therefore the voltage applied to second input of the second differential amplifier, may be selected during the trimming process in order to configure the maximum output current to a desired value under normal operating conditions. Additionally or alternatively, the configurable node may be selected based on detected operating conditions while the device is in operation, thereby providing further ability for the circuit portion to actively respond to changes in operating conditions.

In a set of embodiments, an output of the second differential amplifier is configured to control, at least in part, a voltage at a gate terminal of the main transistor. Thus, the output of the second differential amplifier may be configured to control, at least in part, the output current that flows through the main transistor. Similarly, the output of the second differential amplifier may control, at least in part, a voltage at a gate terminal of the sensing device, and thus also control, at least in part, the current that flows through the sensing device. A bias voltage input of the second differential amplifier may be coupled to the supply rail, and thus the output of the second differential amplifier may be dependent, at least in part, on supply voltage. Hence, the voltage at the gate terminals of the main transistor and the sensing device would also be dependent, at least in part, on supply voltage.

As the output of the second differential amplifier is based on the difference between the voltage at its first input (i.e. the substantially constant reference voltage) and the voltage at its second input (i.e. the voltage at the configurable node within the trimming circuit portion), the output of the second amplifier can track variations in the voltage at the configurable node which may, in turn, track variations in the output current that flows through the main transistor. Thus, the output of the second differential amplifier controls the output current that flows through the main transistor dependent on variations in the output current, thus forming the negative feedback loop described previously.

The output of the second differential amplifier may be coupled to a gate terminal of a feedback transistor, to provide the above-mentioned control of the voltage at the gate terminal of the main transistor based on the output of the second differential amplifier. An input terminal of the feedback transistor may be coupled to the supply rail, and an output terminal of the feedback transistor may be connected to the gate terminal of the main transistor and to a gate terminal of the sensing device.

In a set of embodiments, the circuit portion further comprises an adaptive biasing circuit portion coupled to the trimming circuit portion, wherein: the adaptive biasing circuit portion is configured to provide a first adaptive bias current to the first differential amplifier and a second adaptive bias current to the second differential amplifier, the first and second adaptive bias currents being dependent, at least in part, on a voltage at the input of the trimming circuit portion.

The adaptive biasing circuit portion could, for example, be coupled to an input of the trimming circuit portion. Thus in such arrangements, the first and second adaptive bias currents are dependent, at least in part, on the output current that flows through the main transistor, as the voltage at the input of the trimming circuit portion is dependent, at least in part, on said output current.

The adaptive bias currents may advantageously allow the circuit portion to respond more quickly to changes in the output current by decreasing the response time of the feedback loops—e.g. by providing increased bias current to the differential amplifiers when the output current exceeds the desired maximum. The adaptive bias currents may control, at least in part, the gains of the feedback loops. The adaptive bias currents may be configured such that the gain of each feedback loop is controlled to a desired value, or to a desired range of values across variations in process, voltage and temperature (PVT). By controlling the gains of the feedback loops in this manner, the adaptive bias currents may advantageously increase the stability of the feedback loops, thereby preventing oscillations of the output current around a particular value caused by the feedback loops overly compensating for changes in the output current.

The voltage at the input of the trimming circuit portion may be dependent on the overall resistance of the trimming circuit portion. Thus, the adaptive bias currents may be dependent, at least in part, on the configuration of the trimming circuit portion and on temperature, input voltage and supply voltage.

In a set of embodiments, the circuit portion further comprises a soft-start circuit portion arranged to provide a first gate voltage to the main transistor that causes it to conduct a smaller current during a start-up phase and to provide a second gate voltage to the main transistor that causes it to conduct a larger current after said start-up phase is completed. The soft-start circuit portion may also be arranged to disable the circuit portion. Such an arrangement advantageously allows the circuit portion to be initially enabled with a smaller maximum output current so as to prevent the output current overshooting the desired maximum, on start-up, e.g. due to transient effects of various components included in the circuit portion.

In one example, the soft-start circuit portion comprises a first switch and a corresponding first control resistor having a first resistance, said first switch being closed during said start-up phase, and a second switch and a corresponding second control resistor having a lower resistance, said second switch being closed after said start-up phase. After said start-up phase, the first switch may be opened. The opening of the first switch, after start-up, may occur at substantially the same time as, or a short delay after, the closing of the second switch. Alternatively, after start-up, both switches may remain closed. Regardless of the specific control of the switches, such arrangements may advantageously enable soft behaviour of the circuit portion on start-up.

The terms "circuit", "circuitry" and "circuit portion" as used herein may refer to open circuits or to closed circuits; i.e. they encompass circuit portions that may form part of a closed circuit when connected to other elements such as a power supply.

Features of any aspect or embodiment described herein may, wherever appropriate, be applied to any other aspect or embodiment described herein.

Where reference is made to different embodiments or sets of embodiments, it should be understood that these are not necessarily distinct but may overlap.

BRIEF DESCRIPTION OF THE DRAWINGS

An embodiment of the invention will now be described, by way of example only, with reference to the accompanying drawings, in which.

DETAILED DESCRIPTION OF THE DRAWINGS

Figure 1:
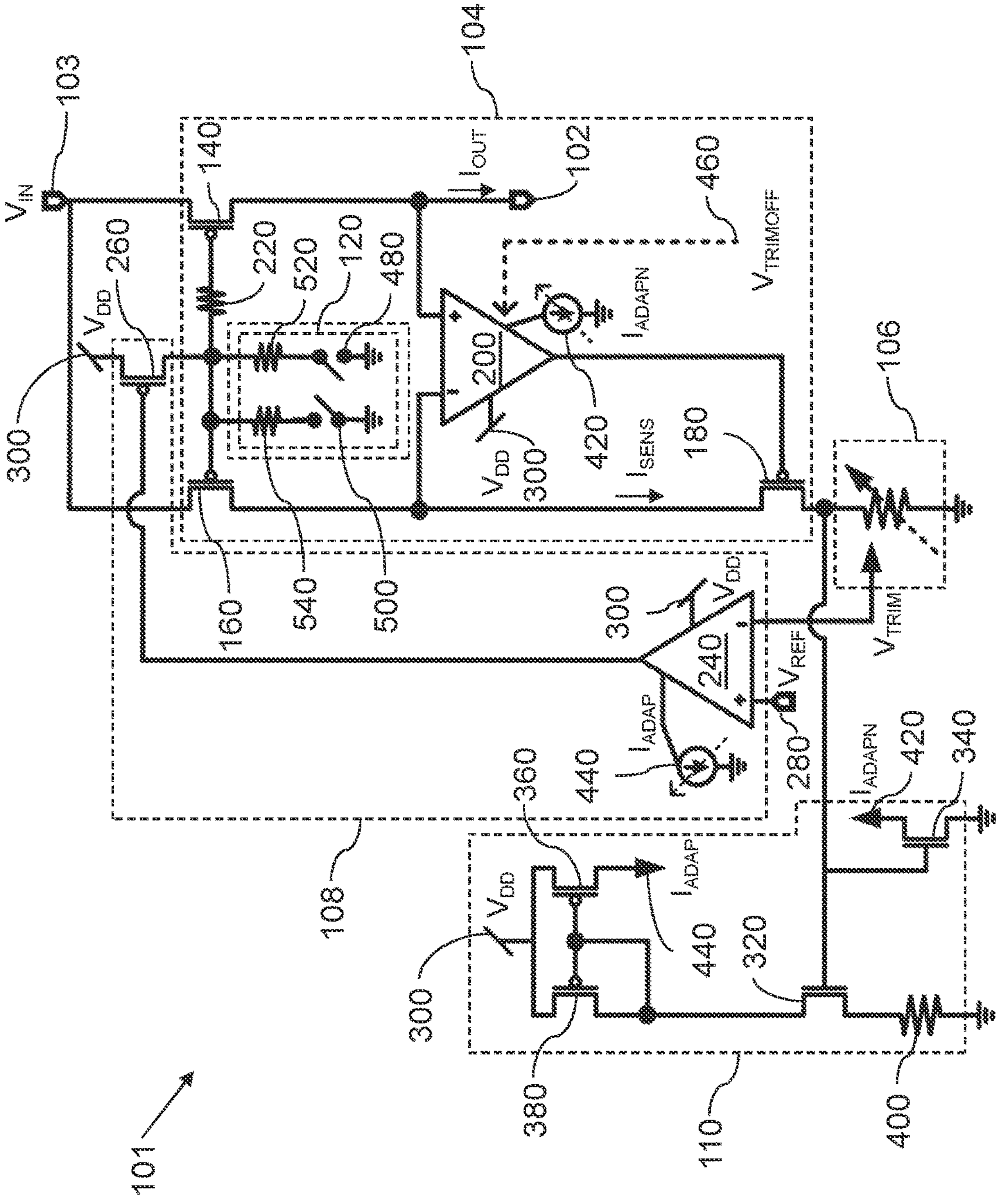
FIG. 1 is a circuit diagram of a circuit portion for limiting an output current in accordance with an embodiment of the present invention.

FIG. 1 shows a diagram of a circuit portion 101 for limiting an output current $I_{OUT}$ that flows through an output pin 102 such that it does not exceed a desired maximum value, according to an embodiment of the present invention. The circuit portion 101 comprises: a sensing circuit portion 104, a trimming circuit portion 106, a feedback circuit portion 108, an adaptive biasing circuit portion 110 and a soft-start circuit portion 120.

The sensing circuit portion 104 comprises a main transistor 140, a sensing device 160, a sensing branch output transistor 180, a first differential amplifier 200 and an electrostatic discharge protection (ESD) resistor 220. In this embodiment, the main transistor 140 and the sensing branch output transistor 180 each comprise P-channel metal-oxide-semiconductor field-effect (PMOS) transistors, and the first differential amplifier 200 comprises an operational transconductance amplifier (OTA). As will be explained in further detail later with reference to FIG. 2, in this embodiment the sensing device 160 comprises a plurality of PMOS transistors, connected in series, with coupled gate terminals. For the sake of simplicity, however, the sensing device 160 can be considered to function as a single PMOS transistor, and is represented as such in FIG. 1.

The source terminal of the main transistor 140 and the source terminal of the sensing device 160 are each coupled to an input voltage line 103, over which an input voltage $V_{IN}$ is received that is to be provided to the output pin 102. The input voltage $V_{IN}$ is subject to variation within a permitted operating range, which in this example is between 1.68V and 1.92V. The gate terminal of the main transistor 140 is coupled, via the ESD resistor 220, to the gate terminal of the sensing device 160. The drain terminal of the main transistor 140 is coupled to the positive input of the first differential amplifier 200, and to the output pin 102. The drain terminal of the sensing device 160 is coupled to the negative input of the first amplifier 200, and to the drain terminal of the sensing branch output transistor 180. The output of the first amplifier 200 is coupled to the gate terminal of the sensing branch output transistor 180. The first bias voltage input of the first amplifier 200 is coupled to the supply rail 300, over which a supply voltage $V_{DD}$ is received. The supply voltage $V_{DD}$ is subject to variation within a permitted operating range, which in this example is between 2.4V and 5.5V. The second voltage bias input of the first amplifier 200 is coupled to an offset trimming input 460 over which a configurable offset trimming voltage signal $V_{TRIMOFF}$ is received.

The trimming circuit portion 106 is described in further detail later with reference to FIG. 2. For the sake of simplicity, however, the trimming circuit portion 106 can be considered to function as a variable resistance from which a configurable trim voltage $V_{TRIM}$ can be tapped, and is represented as such in FIG. 1. The input terminal of the trimming circuit portion 106 is coupled to the source terminal of the sensing branch output transistor 180, and the output terminal of the trimming circuit portion 106 is coupled to ground.

The feedback circuit portion 108 comprises a second differential amplifier 240 and a feedback PMOS transistor 260. In this embodiment, the second differential amplifier 240 comprises an OTA. The configurable trim voltage $V_{TRIM}$, tapped from the trimming circuit portion 106, is applied to the negative input of the second differential amplifier 240. The positive input of the second differential amplifier 240 is coupled to a reference voltage input line 280, over which a substantially constant reference voltage $V_{REF}$ is received. The output of the second differential amplifier 240 is coupled to the gate terminal of the feedback transistor 260. The first bias voltage input of the second amplifier 240 is coupled to the supply rail 300. The second bias voltage input of the second amplifier 240 is coupled to ground, though, for the sake of simplicity, this is not shown in FIG. 1. The source terminal of the feedback transistor 260 is coupled to the supply rail 300, and the drain terminal of the feedback transistor 260 is coupled to the gate terminal of the sensing device 160 and to the ESD resistor 220.

The adaptive biasing circuit portion 110 comprises a measurement NMOS transistor 320, a first biasing NMOS transistor 340, a second biasing PMOS transistor 360, a mirror PMOS transistor 380 and a grounding resistor 400.

The drain terminal of the measurement transistor 320 is coupled to ground, via the grounding resistor 400. The gate terminal of the measurement transistor 320 and the gate terminal of the first biasing transistor 340 are each coupled to the drain terminal of the sensing branch output transistor 180 and to the input terminal of the trimming circuit portion 106. The drain terminal of the first biasing transistor 340 is coupled to ground, and the source terminal of the first biasing transistor 340 is coupled to a first biasing node 420.

The source terminal of the second biasing transistor 360 and the source terminal of the mirror transistor 380 are each coupled to the supply rail 300. The gate terminal of the second biasing transistor 360 is coupled to the gate terminal of the mirror transistor 380. The drain terminal of the second biasing transistor 360 is coupled to a second biasing node 440. The drain terminal of the mirror transistor 380 is coupled to the source terminal of the measurement transistor 320. The mirror transistor 380 is diode-connected, and thus the gate terminal thereof is coupled to the drain terminal thereof.

The current bias input of the first differential amplifier 200 is coupled to the first biasing node 420 of the adaptive biasing circuit portion 110, and the current bias input of the second amplifier 240 is coupled to the second biasing node 440 of the adaptive biasing circuit portion 110. However, for the sake of simplicity, these connections between the differential amplifiers 200, 240 and the biasing nodes 420, 440 respectively are represented in FIG. 1 by variable current sources connected to ground. This arrangement results in the first differential amplifier 200 receiving a first adaptive bias current $I_{ADAPN}$ that is equal to the current flowing through the first biasing transistor 340, and the second differential amplifier 240 receiving a second adaptive bias current $I_{ADAP}$ that is equal to the current flowing through the second biasing transistor 360.

The soft-start circuit portion 120 comprises an enable switch 480, a soft-start switch 500, a first control resistor 520 and a second control resistor 540. The switches 480, 500 are each individually controlled by further circuitry that is not shown in FIG. 1, and may comprise any suitable type of switch including but not limited to physical switches, transistors, etc.

The output terminal of the enable switch 480 is coupled to ground, and the input terminal of the enable switch 480 is coupled, via the first control resistor 520, to the gate terminal of the sensing device 160 and the drain terminal of the feedback transistor 260.

Similarly, the output terminal of the soft-start switch 500 is coupled to ground, and the input terminal of the soft-start switch 500 is coupled, via the second control resistor 540, to the gate terminal of the sensing device 160 and the drain terminal of the feedback transistor 260.

For the purposes of the following description, the circuit portion 101 will be considered to be fully enabled and operating under steady-state conditions, which in this embodiment means that the enable switch 480 is closed, and the soft-start switch 500 is open. The operation of the switches 480 and 500 on start-up of the circuit portion 101 will be described in further detail later.

The input voltage $V_{IN}$ is received at the main transistor 140 and the sensing device 160, causing a current to flow respectively through each. The main transistor 140 and the sensing device 160 are designed such that the current flowing through the sensing device 160 is smaller than the current flowing through the main transistor 140. In this embodiment, the current flowing through the main transistor 140 is approximately one thousand times greater than the current flowing through the sensing device 160. The current that flows through the main transistor 140 also flows through the output pin 102, and is thus the output current $I_{OUT}$.

The current that flows through the sensing device 160, hereinafter referred to as the sensing branch current $I_{SENS}$, also flows through the sensing branch output transistor 180 and the trimming circuit portion 106 and is thus controlled in part by the output of the first amplifier 200, which is proportional to the difference between the voltages at its inputs and thus any mismatch between the output current and the sensing current (taking into account the designed scale factor mentioned above).

The sensing branch current $I_{SENS}$ creates a voltage drop across the trimming circuit portion 106. When the output current $I_{OUT}$ flowing through the main transistor 140 increases (e.g. due to a short circuit at the output pin 2), the sensing branch current $I_{SENS}$ flowing through the sensing device 160 also increases and so this voltage drop also increases. As a result, the configurable trim voltage $V_{TRIM}$, which is tapped from a point along the trimming circuit portion 106, also increases.

The second differential amplifier 240 compares the configurable trim voltage $V_{TRIM}$ to the substantially constant reference voltage $V_{REF}$, and outputs a current that is proportional to the difference between them. In this embodiment, the reference voltage $V_{REF}$ is approximately equal to 0.6V. This current output by the second differential amplifier 240 creates a voltage at the gate terminal of the feedback transistor 260.

When the configurable trim voltage $V_{TRIM}$ increases (e.g. as a result of a short at the output pin 102), it approaches the reference voltage $V_{REF}$. This causes the output current of the second differential amplifier 240 to decrease, thereby decreasing the gate voltage of the feedback transistor 260 thus causing the feedback transistor 260 to conduct more effectively. This increases the voltage at the gate terminals of the main transistor 140 and the sensing device 160, thereby causing the main transistor 140 and the sensing device 160 to conduct less effectively. This causes the currents $I_{OUT}$, $I_{SENS}$ that flow through the main transistor 140 and the sensing device 160 respectively to decrease.

Thus, a negative feedback loop is formed: when the output current $I_{OUT}$ through the main transistor 140 increases, the feedback loop formed by the second differential amplifier 240 and the feedback transistor 260 causes the gate voltage of the main transistor 140 to increase, thus reducing the output current $I_{OUT}$. This feedback loop causes the circuit portion 101 to limit the output current $I_{OUT}$ to a desired maximum value, thus providing short-circuit protection for the output pin 102.

Additionally, the arrangement of the first differential amplifier 200 and the sensing branch output transistor 180 effectively form another feedback loop in which the first amplifier 200 effectively tries to equalise the drain-to-source voltages of the main transistor 140 and the sensing device 160 (where the sensing device 160 is considered as a single effective transistor) by controlling the gate voltage of the sensing branch output transistor 180. This arrangement forces the current $I_{SENS}$ that flows through the sensing device 160 to be proportional to the output current $I_{OUT}$, with the proportionality constant being dependent on the ratio between the size of the main transistor 140 and the size of the sensing device 160—i.e. the size of the effective transistor that the sensing device 160 effectively operates as, which may be equal to the size of one of the plurality of transistors included in the sensing device 160, or to an average size of the plurality of transistors included in the sensing device 160. This advantageously forces the sensing branch current $I_{SENS}$ to closely track any variations that may occur in the output current $I_{OUT}$.

The gains of the feedback loops formed by the differential amplifiers 200, 240 are controlled, in part, by the adaptive bias currents $I_{ADAPN}$, $I_{ADAP}$ provided to the differential amplifiers 200, 240 respectively.

When the voltage at the input terminal of the trimming circuit portion 106 increases as a result of e.g. a short circuit at the output pin 102, as explained earlier, the respective gate voltages of the transistors 320, 340 increase, thereby causing the transistors 320, 340 to conduct more effectively thus increasing the respective currents flowing therethrough.

The increased current through the first biasing transistor 340 increases the first adaptive bias current $I_{ADAPN}$ provided to the first differential amplifier 200. The increased current through the measurement transistor 320 increases the current through the diode-connected mirror transistor 380, and thus the current through the second biasing transistor 360. This increases the second adaptive bias current $I_{ADAP}$ provided to the second differential amplifier 240.

Thus, the first and second adaptive bias currents $I_{ADAPN}$, $I_{ADAP}$ are dependent on the voltage at the input of the trimming circuit portion 106, and thus dependent on the output current $I_{OUT}$. The adaptive bias currents $I_{ADAPN}$, $I_{ADAP}$ are configured to control the gains of the feedback loops formed by the differential amplifiers 200, 240 to be high enough to increase the speed of both loops' response to changes in the output current $I_{OUT}$, but low enough to provide increased stability to the respective feedback loops formed by the amplifiers 200, 240 across process, voltage and temperature (PVT) variations.

The enable switch 480 and the soft-start switch 500 are controlled by further control circuitry (not shown in FIG. 1) in order to enable/disable the circuit portion 101.

When both switches 480, 500 are open, the circuit portion 101 is disabled. When at least one of the switches 480, 500 is closed, the circuit portion 101 is enabled, with the closed switches 480, 500 providing current paths from the gate terminals of the main transistor 140 and the sensing device 160 to ground via the respective control resistors 520, 540. This enables the feedback loop formed by the second differential amplifier 240 and the feedback transistor 260 to control the voltage at the gate terminal of the main transistor 140 in order to limit the output current $I_{OUT}$ to a desired value, or range of values dependent on operating conditions.

The provision of the two independently controlled switches 480, 500 and their respective control resistors 520, 540 enables the start-up of the circuit portion 101 to be controlled so as to prevent initial spikes in the output current $I_{OUT}$ that may occur as a result of transient effects of various components included in the circuit portion 101 on start-up. This is accomplished by providing a higher resistance path from the gate terminals of the main transistor 140 and the sensing device 160 to ground when the circuit portion 101 is initially enabled, and then providing a lower resistance path from said gate terminals to ground after a sufficient period of time for any transient effects to pass. Providing a higher resistance path to ground on start-up in this manner increases the voltage at the gate terminals of the main transistor 140 and the sensing device 160, thereby decreasing the maximum output current $I_{OUT}$ that is permitted by the circuit portion 101 and thus result in softer start-up behaviour of the circuit portion 101. This can also be explained by considering the parasitic capacitance at the gate terminal of the main transistor 140 and the resistance from the gate terminals of the main transistor 140 and the sensing device 160 to ground as a resistor-capacitor (RC) circuit. Increasing the resistance to ground increases the overall RC time constant of the RC circuit and therefore causes the gate voltages of the main transistor 140 and the sensing device 160 to settle to a steady-state condition a longer period of time after initial start-up. This limits the maximum output current $I_{OUT}$ that is permitted by the circuit portion 101 on start-up, resulting in softer start-up behaviour of the circuit portion 101.

In this embodiment, the first control resistor 520 has a smaller resistance than the second control resistor 540. Thus, when the circuit portion 101 is initially enabled, the soft-start switch 500 is initially closed while leaving the enable switch 480 open, providing a higher resistance path from the gate terminal of the main transistor 140 to ground. Then, after a sufficient period of time to enable any transient effects to pass, the enable switch 480 is closed and the soft-start switch 500 is opened, thus providing a lower resistance path from the gate terminal of the main transistor 140 to ground. The circuit portion 101 is then fully enabled and operating as normal. There may in some embodiments be an overlap where both switches 480, 500 are closed, before the soft-start switch 500 is opened.

In other embodiments, instead of opening the soft-start switch 500 after start-up is complete, the enable switch 480 is closed while leaving the soft-start switch 500 closed after start-up, thereby also providing a lower resistance path to ground. It will be appreciated that the start-up control of the switches 480, 500 may be modified in any suitable manner in dependence on the resistances of the control resistors 520, 540.

The trimming circuit portion 106 and the sensing device 160 will now be described in detail, with reference to FIG. 2. In this embodiment, the trimming circuit portion 106 comprises a first bypassable resistor 560, two non-bypassable resistors 580, 590, a variable resistor 600 and a condition-tracking NMOS transistor 620. The variable resistor 600 comprises a plurality of non-bypassable resistors 640 and a bypassable resistor 660. In this embodiment, resistive part of the trimming circuit portion 106 comprises the first bypassable resistor 560, the two non-bypassable resistors 580, 590 and the variable resistor 600, and the condition-tracking part of the trimming circuit portion 106 comprises the condition-tracking transistor 620. The resistors 560, 580, 590 may have any suitable resistance value: they may have equal resistances, or they may have different resistances, dependent on desired functionality of the trimming circuit portion 106.

In this embodiment, the resistors 560, 580, 590, 640, 660 are connected in series, as a chain, between the drain terminal of the sensing branch output transistor 180 and the source terminal of the condition-tracking transistor 620. The source terminal of the condition-tracking transistor 620 is connected to ground. It will be appreciated by those skilled in the art that the resistors 560, 580, 590, 640, 660 are not limited to being connected in series as shown in FIG. 2: in other embodiments, the resistors 560, 580, 590, 640, 660 may be connected in any suitable manner (e.g. in parallel) in order to provide a desired overall resistance for the resistive part of the trimming circuit portion 106.

The bypassable resistors 560, 660 are respectively connected, in parallel, to two bypass NMOS transistors 680, 700. The gate terminals of the bypass transistors 680, 700 are connected to a bypass control line 720, over which a bypass control signal CTRL is received from further circuitry that is not shown in the figures. In this embodiment, each of the bypass transistors 680, 700 respectively form selective bypass connections as referred to previously.

In this embodiment, the sensing device 160 comprises five sensing PMOS transistors 740, 760, 780, 800, 820 connected in series, with their gate terminals connected together. It will be appreciated that the sensing device 160 is not limited to five transistors as shown in this embodiment, but may comprise any suitable number of transistors, dependent on configuration. In this embodiment, the five sensing PMOS transistors 740, 760, 780, 800, 820 each comprise the same unit cell size transistor, though it will be appreciated that in other embodiments they may comprise different sized transistors. This arrangement causes the sensing device 160 to effectively operate as a single effective transistor with a size equal to that of one of the sensing PMOS transistors 740, 760, 780, 800, 820, or equal to the average size of the sensing PMOS transistors 740, 760, 780, 800, 820. The source terminal of the first sensing transistor 740 is coupled to the input voltage line 103 and the drain terminal of the fifth sensing transistor 820 is coupled to the source terminal of the sensing branch output transistor 180.

Figure 2:
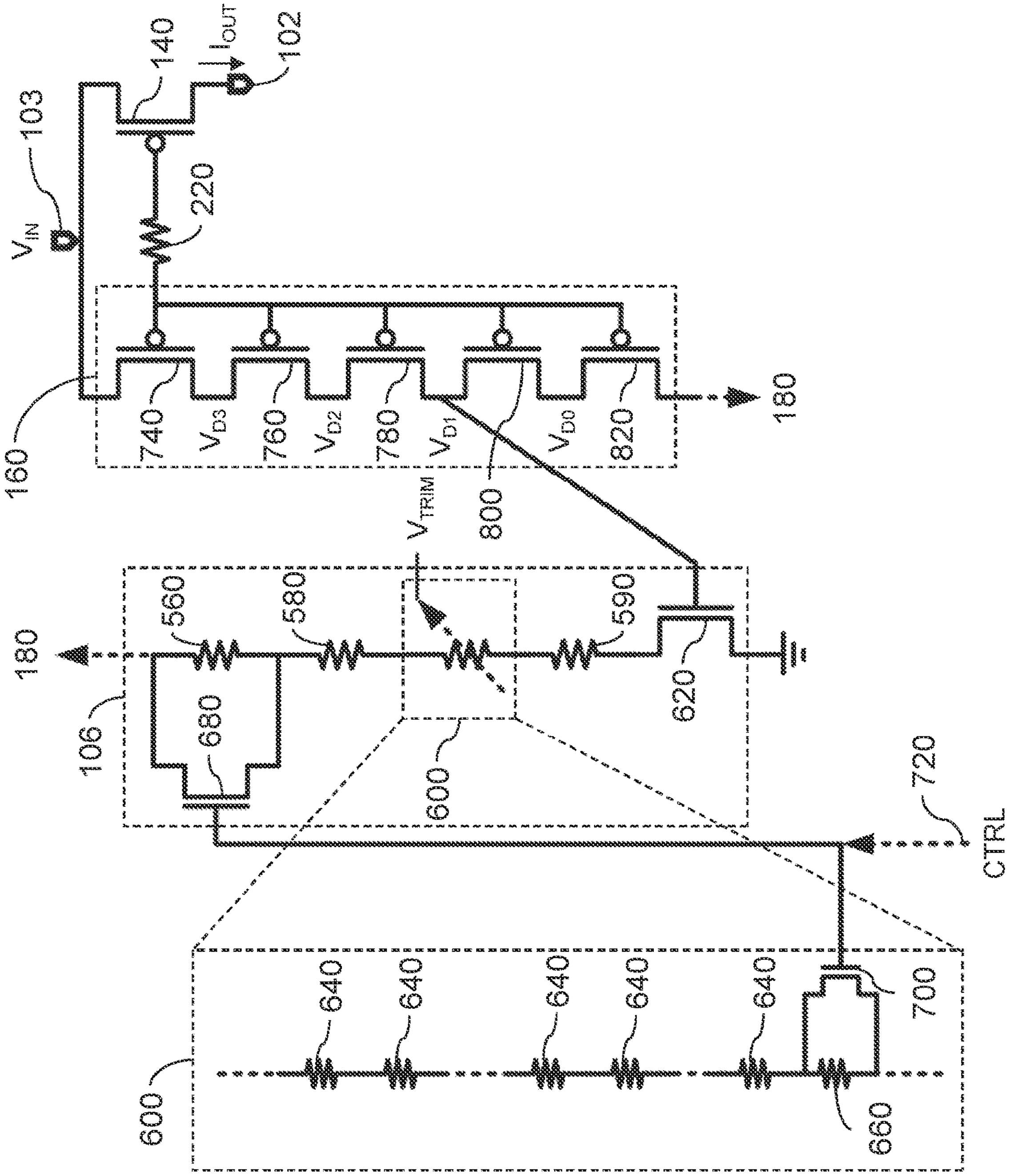
FIG. 2 is a more detailed circuit diagram of the trimming circuit portion, and sensing device of the circuit portion of FIG. 1.

In FIG. 2, the gate terminal of the condition-tracking transistor 620 is shown to be coupled to the drain terminal of the third sensing transistor 780 and the source terminal of the fourth sensing transistor 800. This connection is configurable, using further circuitry that is not shown in the figures, such that the gate terminal of the condition-tracking transistor 620 may be connected to the drain terminal of any one of the first, second, third or fourth transistors 740, 760, 780, 800 (and, respectively, the source terminal of any one of the second, third, fourth or fifth transistors 760, 780, 800, 820). In other words, the gate terminal of the condition-tracking transistor 620 is connected to a configurable node within the sensing device 160.

The trimming circuit portion 106 provides two main benefits to the circuit portion 101: i) it enables the circuit portion 101 to be trimmed (i.e. configured after manufacture, but before deployment) so as to configure the maximum output current $I_{OUT}$ permitted by the circuit portion 101 to a desired value; and ii) it reduces variation in the maximum output current $I_{OUT}$ permitted by the circuit portion 101 that may occur as a result of variations in temperature, supply voltage $V_{DD}$ and input voltage $V_{IN}$.

The operation of the trimming circuit portion 106 will now be described in detail. The overall resistance of the trimming circuit portion 106 in this embodiment is the sum of the resistances of the series-connected resistors 560, 580, 590, 640, 660 that have not been bypassed and the resistance of the condition-tracking transistor 620.

In this embodiment, the condition-tracking transistor 620 is provided with a configurable gate voltage that causes it to operate in the linear region. The condition-tracking transistor 620 can therefore be considered to function similarly to a conventional resistor, but with a resistance that is dependent on both the gate voltage fed thereto and temperature.

The voltages $V_{D0}$, $V_{D1}$, $V_{D2}$, $V_{D3}$ at each of the nodes within the sensing device 160 vary in dependence on the input voltage $V_{IN}$, as the source terminal of the sensing transistor 740 is coupled to the input line 103. In other words, if the input voltage $V_{IN}$ decreases, the voltages $V_{D0}$, $V_{D1}$, $V_{D2}$, $V_{D3}$ at each of the nodes within the sensing device 160 decrease accordingly. Thus, the gate voltage of the condition-tracking transistor 620 is dependent, in part, on the input voltage $V_{IN}$.

Furthermore, the voltages $V_{D0}$, $V_{D1}$, $V_{D2}$, $V_{D3}$ at each of the nodes within the sensing device 160 vary in dependence on the supply voltage $V_{DD}$. This is because the gate terminals of the sensing transistors 740, 760, 780, 800, 820 are coupled to the feedback transistor 260, whose gate terminal is coupled to the output of the second amplifier 240. As the supply voltage $V_{DD}$ is provided to the second amplifier 240 as its bias voltage, the output of the second amplifier 240, and therefore the gate voltage of the feedback transistor 260, are dependent in part on the supply voltage $V_{DD}$. Furthermore, as the source terminal of the feedback transistor 260 is coupled to the supply rail 300, the voltage at said source terminal is also dependent on the supply voltage $V_{DD}$. Hence, the voltage at the drain terminal of the feedback transistor 260, and thus the gate voltages of the sensing transistors 740, 760, 780, 800, 820, are dependent in part on the supply voltage $V_{DD}$. Thus, the resistances of the sensing transistors 740, 760, 780, 800, 820, and therefore the voltages $V_{D0}$, $V_{D1}$, $V_{D2}$, $V_{D3}$ at each of the nodes within the sensing device 160, are dependent in part on the supply voltage $V_{DD}$.

It will therefore be seen that the gate voltage of the condition-tracking transistor 620 is dependent on both input voltage $V_{IN}$ and supply voltage $V_{DD}$, and thus the resistance of the condition-tracking transistor 620 changes in dependence on supply voltage $V_{DD}$ and input voltage $V_{IN}$, as well as temperature due to the inherent temperature dependency of transistors. However in the present embodiment whereby the input voltage is lower than the supply voltage, the dependence on input voltage will be larger than the dependence on supply voltage.

This condition-tracking resistance of the condition-tracking transistor 620 advantageously counter-acts variations in parameters of other components included in the circuit portion 101 that may occur as a result of varying supply voltage $V_{DD}$, input voltage $V_{IN}$ and temperature. This advantageously reduces variation in the maximum output current $I_{OUT}$ permitted by the circuit portion 101 that occurs as a result of such variations.

Once the circuit portion 101 has been manufactured, various measurements may be taken at various nodes of the circuit portion 101 (particularly the output pin 102) in order to experimentally determine how that particular manufacture of the circuit portion 101 operates at typical operating conditions ($V_{DD}$=3.7V, $V_{IN}$=1.8V, Temperature=27° C.). From these measurements, a trim code may be obtained which can be used to determine the configuration that should be used for the circuit portion 101 for optimal operation.

Once a trim code has been obtained, further control circuitry (not shown in the figures) is used to configure the trimming circuit portion 106 for optimal operation. A number of different elements of the trimming circuit portion 106 can be configured based on the trim code.

One element that can be configured based on the measured trim code is the overall resistance of the resistive part of the trimming circuit portion 106. This is configured by selectively shorting the bypassable resistors 560, 660 using the bypass control signal CTRL, transmitted over the bypass control line 720. This allows the adaptive bias currents $I_{ADAPN}$, $I_{ADAP}$ provided by the adaptive bias circuit portion 110 to the first and second amplifiers 200, 240 respectively to be configured as desired, as these bias currents are dependent on the voltage at the input terminal of the trimming circuit portion 106, as explained earlier with reference to FIG. 1.

Another element that may be configured in dependence on the trim code is the point from which the trim voltage $V_{TRIM}$ is tapped within the trimming circuit portion 106. In this embodiment, the trim voltage $V_{TRIM}$ may be tapped from any point along the variable resistor 600 (i.e. at any node located between any two resistors 640, 660). This may be implemented in any appropriate manner, e.g. through physical switches, transistors, etc. This allows the maximum output current $I_{OUT}$ permitted by the circuit portion 101 to be configured to a particular value under normal operating conditions, or a particular range of values in dependence on operating conditions.

Another element that may be configured in dependence on the trim code is the voltage that is fed to the gate terminal of the condition-tracking transistor 620. In this embodiment, this is configured by configuring which drain terminal of the sensing transistors 760, 780, 800, 820 is connected to the gate terminal of the condition-tracking transistor 620, and thus which of the voltages $V_{D0}$, $V_{D1}$, $V_{D2}$, $V_{D3}$ is received by said gate terminal. This may be implemented in any appropriate manner, e.g. through physical switches, transistors, etc. This enables the condition-tracking transistor 620 to be configured for optimal operation—e.g. optimal tracking of variations in temperature, input voltage $V_{IN}$ and supply voltage $V_{DD}$.

In the embodiment shown in FIG. 2, the gate terminal of the condition-tracking transistor 620 is coupled to a node within the sensing device 160. However, in other embodiments, the gate terminal of the condition-tracking transistor 620 may be coupled to any appropriate voltage or current source instead. For example, in some embodiments, the gate terminal of the condition-tracking transistor 620 is not coupled to any node within the sensing device 160 and is instead coupled to a temperature dependent current source (not shown in the figures) which is configured to provide a gate voltage to the condition-tracking transistor 620 that tracks variations in input voltage $V_{IN}$ and, to some extent, supply voltage $V_{DD}$.

Turning back to FIG. 1, another element that may be configured in dependence on the trim code is the offset trimming voltage signal $V_{TRIMOFF}$, which is received by the second voltage bias input of the first amplifier 200 via the offset trimming input 460. The offset trimming voltage signal $V_{TRIMOFF}$ may be controlled by further control circuitry that is not shown in the figures. By controlling the offset trimming voltage signal $V_{TRIMOFF}$, the circuit portion 101 is able to adapt to manufacturing variations between the main transistor 140 and the sensing device 160 by biasing the first amplifier 200 more towards its positive input or towards its negative input.

It has been found through experimentation that by using the circuit portion 101, particularly the trimming circuit portion 106, in accordance with embodiments of the present invention, the variation in the maximum output current $I_{OUT}$ permitted by the circuit portion 101 that occurs as a result of variations in supply voltage $V_{DD}$, input voltage $V_{IN}$ and temperature may be reduced when compared to e.g. the use of a simple chain of resistors, connected in series, in place of the trimming circuit portion 106.

An experiment was performed in which the performance of the circuit portion 101 using a simple chain of resistors in place of the trimming circuit portion 106 was compared to the performance of the circuit portion 101 using the trimming circuit portion 106 in accordance with the present invention, after trimming had been performed. In this experiment, the target limit on the output current $I_{OUT}$ was set to 50 mA by trimming the circuit portion 101 appropriately, and measurements of the output current $I_{OUT}$ were taken at three defined corner conditions: typical ($V_{DD}$=3.7V, $V_{IN}$=1.8V, Temperature=27° C.), fast ($V_{DD}$=2.4V-5.5V, $V_{IN}$=1.68V-1.92V, Temperature=−40° C.-125° C.) and slow ($V_{DD}$=2.4V-5.5V, $V_{IN}$=1.68V-1.92V, Temperature=−40° C.-125° C.).

It was found that, after trimming, using a simple chain of resistors in place of the trimming circuit portion 106 provided a minimum output current $I_{OUT}$ limit of 41.01 mA and a maximum of 75.67 mA across corners (translating to a deviation of −18.00% to +51.34% from the target, or 69.34% total variation). By contrast, using the trimming circuit portion 106 in accordance with an embodiment of the present invention, in combination with the remainder of the circuit portion 101, provided a minimum output current $I_{OUT}$ limit of 39.83 mA and a maximum of 60.84 mA across corners (translating to a deviation of −20.30% to +21.70% from the target, or 42.00% total variation).

Thus, it will be seen that the circuit portion 101 including the trimming circuit portion 106 in accordance with an embodiment of the present invention provides the distinct advantage of reducing variation in the output current $I_{OUT}$ limit due to variations in supply voltage $V_{DD}$, input voltage $V_{IN}$ and temperature.

A number of transistors have been described herein with reference to FIG. 1. It will be understood by those skilled in the art that although these transistors have been described as being a particular type of transistor in this embodiment (e.g. PMOS, NMOS, etc.), they are not limited as such and may equally comprise any suitable type of transistor or any suitable number of transistors connected appropriately.

It will be appreciated by those skilled in the art that the invention has been illustrated by describing one or more specific embodiments thereof, but is not limited to these embodiments; many variations and modifications are possible within the scope of the appended claims.

The invention claimed is:

1. A current limiting circuit portion for limiting an output current of an electronic device, the current limiting circuit portion comprising:

an input voltage line for receiving an input voltage;

a trimming circuit portion comprising:

a resistive part providing a first resistance that is configurable based on one or more resistance control signals applied thereto; and a condition-tracking part connected in series with the resistive part and comprising a condition-tracking transistor, the condition-tracking part providing a second resistance that is dependent on temperature and said input voltage; and wherein the current limiting circuit portion further comprises a supply rail, separate from the input voltage line, for receiving a supply voltage, wherein the second resistance provided by the condition-tracking part is further dependent on said supply voltage.

2. The current limiting circuit portion as claimed in claim 1, wherein a gate terminal of the condition-tracking transistor is coupled to a configurable voltage source, the configurable voltage source being configured to provide a voltage to the gate terminal of the condition-tracking transistor that causes the condition-tracking transistor to operate in a linear region.

3. The current limiting circuit portion as claimed in claim 2, wherein the configurable voltage source is configured to supply the gate terminal of the condition-tracking transistor with a voltage that is dependent on said supply voltage and said input voltage.

4. The current limiting circuit portion as claimed in claim 1, wherein the resistive part comprises a plurality of resistors and a selective bypass connection arranged to bypass at least one of the plurality of resistors in dependence on the one or more resistance control signals.

5. The current limiting circuit portion as claimed in claim 4, wherein the selective bypass connection comprises at least one bypass transistor, and wherein the one or more resistance control signals are fed to a gate terminal of the at least one bypass transistor.

6. The current limiting circuit portion as claimed in claim 1 further comprising a sensing circuit portion, the sensing circuit portion comprising:

a main transistor; and a sensing device;

wherein:

the main transistor is arranged such that the output current flows therethrough; and the sensing device is coupled to the main transistor and configured such that a current that flows through the sensing device is dependent, at least in part, on the output current.

7. The current limiting circuit portion as claimed in claim 6, wherein:

a gate terminal of the sensing device is connected to a gate terminal of the main transistor;

an input terminal of the main transistor is coupled to the input voltage line; and an input terminal of the sensing device is coupled to the input voltage line.

8. The current limiting circuit portion as claimed in claim 6, wherein an output of the sensing circuit portion is coupled to an input of the trimming circuit portion such that any current that flows through the sensing device also flows through the trimming circuit portion.

9. The current limiting circuit portion as claimed in claim 6, wherein the sensing circuit portion further comprises a first differential amplifier, wherein:

a first input of the first differential amplifier is coupled to an output terminal of the main transistor;

a second input of the first differential amplifier is coupled to an output terminal of the sensing device; and an output of the first differential amplifier is coupled to a gate terminal of a sensing branch output transistor that is located in a same current path as the sensing device.

10. The current limiting circuit portion as claimed in claim 9, further comprising an adaptive biasing circuit portion coupled to the trimming circuit portion, the adaptive biasing circuit portion being configured to provide a first adaptive bias current to the first differential amplifier that is dependent, at least in part, on a voltage at an input of the trimming circuit portion.

11. The current limiting circuit portion as claimed in claim 6, wherein the sensing device comprises a plurality of sensing transistors connected in series, wherein a gate terminal of each sensing transistor is coupled to a gate terminal of each other sensing transistor.

12. The current limiting circuit portion as claimed in claim 11, wherein a gate terminal of the condition-tracking transistor is coupled to a configurable voltage source, the configurable voltage source comprising a configurable connection to one of a plurality of nodes within the sensing device.

13. The current limiting circuit portion as claimed in claim 6, wherein the sensing circuit portion further comprises a feedback loop configured to counter-act increases in the output current that flows through the main transistor.

14. The current limiting circuit portion as claimed in claim 13, wherein the feedback loop comprises a second differential amplifier with a first input coupled to a substantially constant reference voltage and a second input coupled to a configurable node within the trimming circuit portion.

15. The current limiting circuit portion as claimed in claim 14, wherein an output of the second differential amplifier is configured to control, at least in part, a voltage at a gate terminal of the main transistor.

16. The current limiting circuit portion as claimed in claim 14, wherein:

an output of the second differential amplifier is coupled to a gate terminal of a feedback transistor;

an input terminal of the feedback transistor is coupled to the supply rail; and an output terminal of the feedback transistor is connected to a gate terminal of the main transistor and to a gate terminal of the sensing device.

17. The current limiting circuit portion as claimed in claim 14 further comprising an adaptive biasing circuit portion coupled to the trimming circuit portion, the adaptive biasing circuit portion being configured to provide a second adaptive bias current to the second differential amplifier that is dependent, at least in part, on a voltage at an input of the trimming circuit portion.

18. The current limiting circuit portion as claimed in claim 6, further comprising a soft-start circuit portion arranged to provide a first gate voltage to the main transistor that causes the main transistor to conduct a smaller current during a start-up phase and to provide a second gate voltage to the main transistor that causes the main transistor to conduct a larger current after said start-up phase is completed.

19. The current limiting circuit portion as claimed in claim 18, wherein the soft-start circuit portion comprises a first switch and a corresponding first control resistor having a third resistance, said first switch being closed during said start-up phase, and a second switch and a corresponding second control resistor having a lower resistance than the third resistance, said second switch being closed after said start-up phase.

* * * * *